United States Patent
Vu et al.

(10) Patent No.: US 8,358,999 B1
(45) Date of Patent: Jan. 22, 2013

(54) SYSTEM AND METHOD FOR PROVIDING DISPATCH CALL FEATURES

(75) Inventors: Trinh D. Vu, Ashburn, VA (US); Karalyn M. Szuszczewicz, Haymarket, VA (US); Dan Tillet, Oak Hill, VA (US); Jeffrey Scott Posner, N. Bethesda, MD (US)

(73) Assignee: Nextel Communications Inc., Reston, VA (US)

( * ) Notice: Subject to any disclaimer, the term of this patent is extended or adjusted under 35 U.S.C. 154(b) by 1636 days.

(21) Appl. No.: 11/454,786

(22) Filed: Jun. 19, 2006

Related U.S. Application Data

(60) Provisional application No. 60/691,862, filed on Jun. 18, 2005.

(51) Int. Cl.
*H04M 11/04* (2006.01)

(52) U.S. Cl. .................. 455/404.1; 455/426.1; 455/458; 455/459; 455/500; 455/507; 455/515; 455/517; 455/521

(58) Field of Classification Search .................. None
See application file for complete search history.

(56) References Cited

U.S. PATENT DOCUMENTS

| | | | | |
|---|---|---|---|---|
| 5,721,537 A | * | 2/1998 | Protas | 340/7.1 |
| 5,894,504 A | * | 4/1999 | Alfred et al. | 379/88.13 |
| 5,970,387 A | * | 10/1999 | Yuan | 340/7.28 |
| 6,111,943 A | * | 8/2000 | Strom et al. | 379/211.02 |
| 6,112,083 A | * | 8/2000 | Sweet et al. | 455/426.1 |
| 2005/0130683 A1 | * | 6/2005 | Phang et al. | 455/462 |
| 2005/0190789 A1 | * | 9/2005 | Salkini et al. | 370/466 |
| 2006/0062366 A1 | * | 3/2006 | Tiruthani et al. | 379/201.01 |
| 2006/0063551 A1 | | 3/2006 | Martin et al. | |

* cited by examiner

*Primary Examiner* — Patrick Edouard
*Assistant Examiner* — Matthew Genack

(57) ABSTRACT

Systems and methods for providing dispatch call features are provided. The dispatch call features include the ability to maintain multiple simultaneous dispatch calls and the ability to manage multiple dispatch stations. The maintenance of multiple simultaneous dispatch calls feature allows a dispatch station to place a current dispatch call on-hold to either initiate a new dispatch call or to accept an incoming dispatch call. The management of multiple dispatch stations feature allows a number of dispatch stations to be associated with one or more dispatch station identifiers. When a dispatch call is made to one of the dispatch station identifiers, all associated dispatch stations are paged. The first dispatch station to respond to the page is connected to the incoming dispatch call.

7 Claims, 5 Drawing Sheets

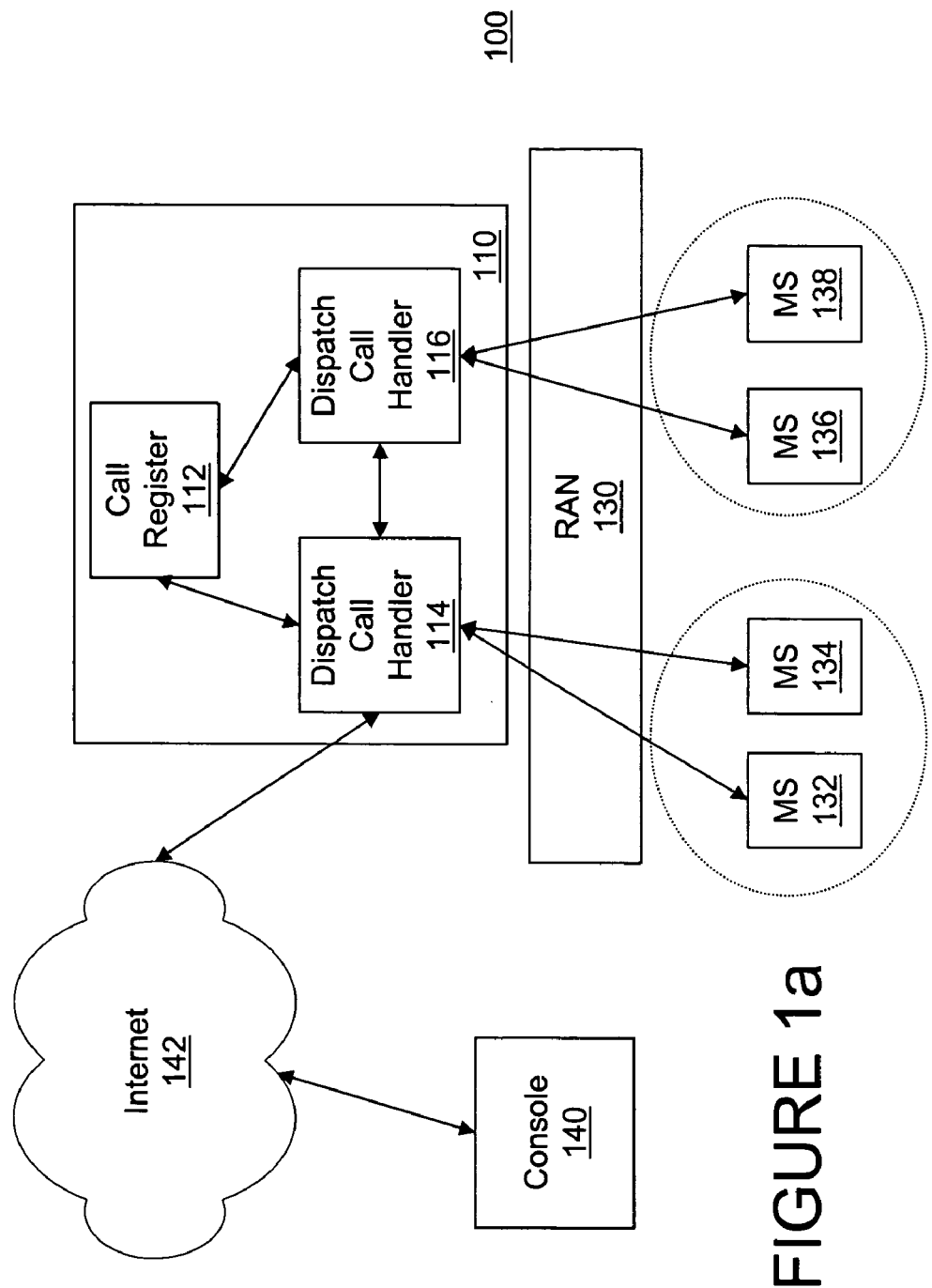

SYSTEM AND METHOD FOR PROVIDING DISPATCH CALL FEATURES

The present application claims priority under 35 U.S.C. §119 to U.S. Provisional Application No. 60/691,862, filed Jun. 18, 2005, and is related to U.S. patent application Ser. No. 11/227,358, filed Sep. 15, 2005 and U.S. patent application Ser. No. 11/294,396, filed Dec. 6, 2005, the entire disclosure of these documents is herein expressly incorporated by reference.

BACKGROUND OF THE INVENTION

The mobility afforded by wireless communication networks has resulted in increased usage of such networks. Wireless networks can be divided into private wireless networks and publicly-accessible wireless networks. Private wireless networks, also known as private trunking radio networks, are commonly operated by public safety agencies, taxi services and delivery services. A majority of private wireless networks provide only dispatch communication services, whereas a majority of publicly-accessible wireless networks provide only interconnect communication services. Some publicly-accessible wireless networks, however, provide both interconnect and dispatch communication services. Dispatch communication services are sometimes referred to as "walkie-talkie" communication services because of the half-duplex nature of the communications. Interconnect communication services are what is typically referred to as circuit-switched voice communications, and are full-duplex.

Private wireless networks typically operate over a limited range of frequencies and within limited geographic areas. Additionally, private wireless networks typically operate using proprietary protocols, have limited expansion capabilities, are expensive to operate and cannot easily interoperate with other private or publicly-accessible wireless networks. In contrast, publicly-accessible wireless networks typically operate over a larger number of frequencies and provide coverage over larger geographic areas. Moreover, publicly-accessible wireless networks use standard protocols, are easier to expand, and interoperate with other publicly-accessible wireless networks.

Due to the relative complexity of publicly-accessible dispatch communication networks compared to private dispatch communication networks, some of the features and functionalities provided in private dispatch communication networks are not offered in publicly-accessible dispatch communication networks. Specifically, private dispatch communication networks typically have a single, centrally-located, communications processor (or call handler) for managing and routing communications between wireless stations. In contrast, publicly-accessible dispatch communication networks have a distributed architecture which involves routing communications between a number of communication processors. Moreover, due to the differences between interconnect and dispatch communication services, many features provided for interconnect communication services are not available for dispatch communication services.

SUMMARY OF THE INVENTION

The present invention provides systems and methods for dispatch calling features. These calling features include the ability to conduct multiple simultaneous dispatch calls and the management of multiple dispatch stations. In conventional communication systems when a dispatch station is engaged in a dispatch call, the current call must be disconnected before initiating a second call, and the dispatch station is not notified of incoming dispatch calls. In accordance with exemplary embodiments of the present invention, a dispatch station can place a current dispatch call on-hold and initiate a second dispatch call. The dispatch station can freely switch between the dispatch calls. Moreover, when a dispatch station is engaged in a dispatch call, the dispatch station can be notified of the incoming dispatch call and provided with an option to place the current call on-hold and connect to the incoming call. Again, the dispatch station can freely switch between the dispatch calls.

Conventional communication systems also do not provide a way to manage multiple dispatch stations. For example, a user may have a number of dispatch stations, each with a different dispatch station identifier, e.g., a calling address. Due to the limitations of conventional communication systems, the user may miss incoming dispatch calls unless the user carries each of the multiple dispatch stations. In accordance with exemplary embodiments of the present invention, a number of dispatch stations can be associated with one or more dispatch station identifiers. When a dispatch call is initiated to one of the dispatch station identifiers, all of the associated dispatch stations are paged. The first dispatch station to respond to the page will continue on the dispatch call, and the paging procedure for the other dispatch stations will be terminated.

Other objects, advantages and novel features of the present invention will become apparent from the following detailed description of the invention when considered in conjunction with the accompanying drawings.

BRIEF DESCRIPTION OF THE DRAWING FIGURES

FIGS. 1a and 1b are block diagrams illustrating exemplary systems in accordance with the present invention;

DETAILED DESCRIPTION OF THE PREFERRED EMBODIMENTS

Figure 1B:
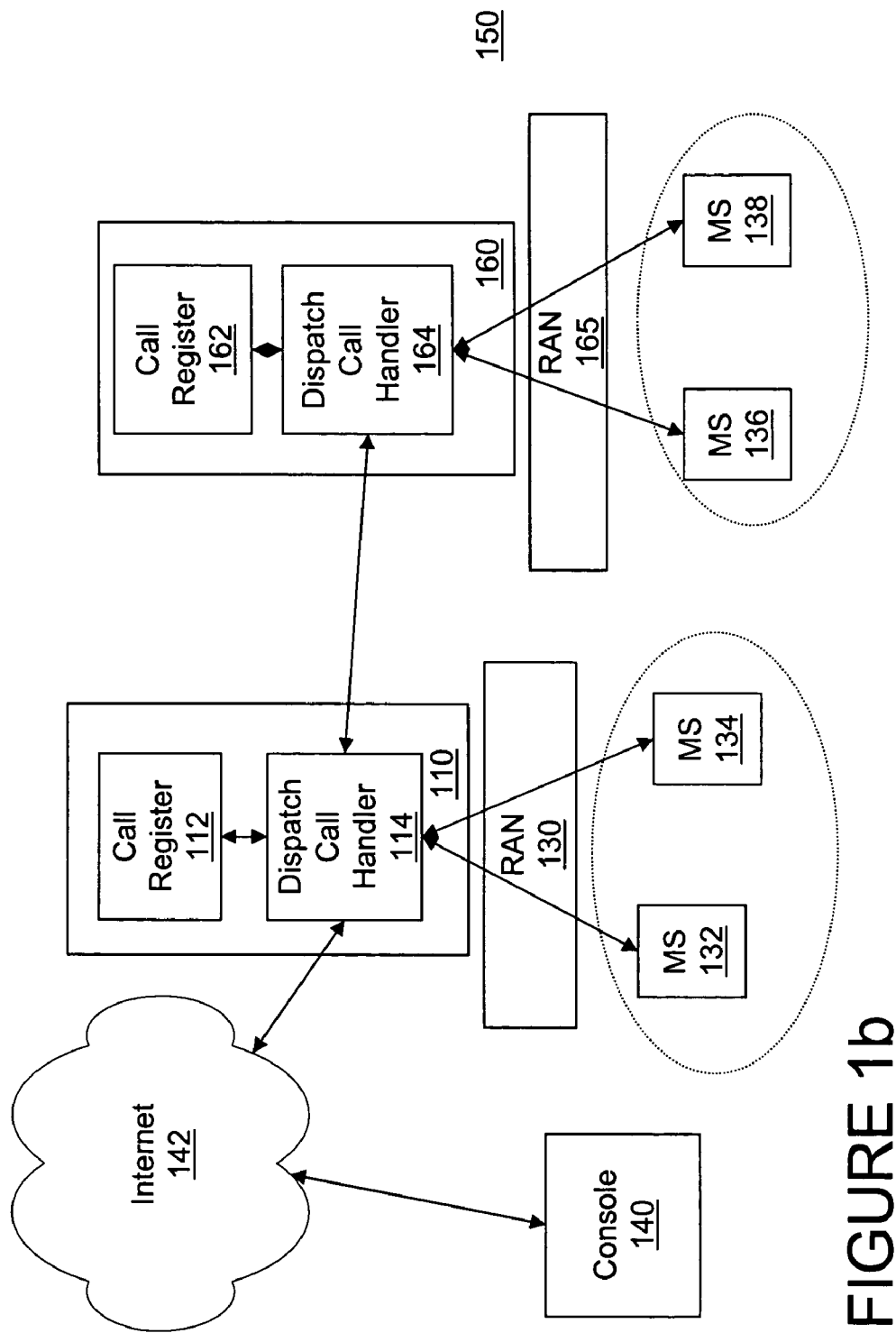

FIG. 1a illustrates an exemplary system 100 in accordance with the present invention. The system 100 includes a dispatch area network subsystem 110 and a radio access network (RAN) 130. A dispatch area is a geographic area which includes two or more cells that share network subsystems, such as mobile switching centers (MSCs) and location registers. The dispatch area network subsystem 110 includes a call register 112, and first and second dispatch call handlers 114 and 116. The call register 112 generally operates in a similar manner to a location register and performs the functions of a home location register (HLR) to register and authenticate the user. Each call handler generally operates in a similar manner to an MSC/visitor location register (MSC/VLR) or a dispatch application processor (DAP).

The first dispatch call handler supports communications from dispatch stations 132 and 134, and the second dispatch call handler supports communications from dispatch stations 136 and 138. As used herein, a dispatch station is capable of at least dispatch communications, and if properly equipped, can perform interconnect and/or data communications. These dispatch stations can be wireless telephones, personal digital assistants (PDAs), laptop computers and/or the like.

The system also includes a dispatch console 140 which connects to dispatch call handler 114 via the Internet 142, thereby allowing the dispatch console to perform dispatch communications with the wireless dispatch stations 132-138. Dispatch console 140 can be a console dedicated to dispatch communications, a general purpose computer executing a program for dispatch communications, or the like.

FIG. 1b illustrates an exemplary system 150 in accordance with another embodiment of the present invention. The system illustrated in FIG. 1b is similar to the system illustrated in FIG. 1a, and hence, like elements include the same reference numbers. The difference between the systems of FIGS. 1a and 1b is that in FIG. 1a the first and second dispatch call handlers 114 and 116 are located in the same dispatch area network subsystem 110, whereas in FIG. 1b, the first and second dispatch call handlers are located in different dispatch area network subsystems 110 and 160. Because the second dispatch call handler 164 is located in a different dispatch area network subsystem than the first dispatch call handler 114, the second dispatch call handler uses a different call register and RAN, i.e., call register 162 and RAN 165.

Figure 2:
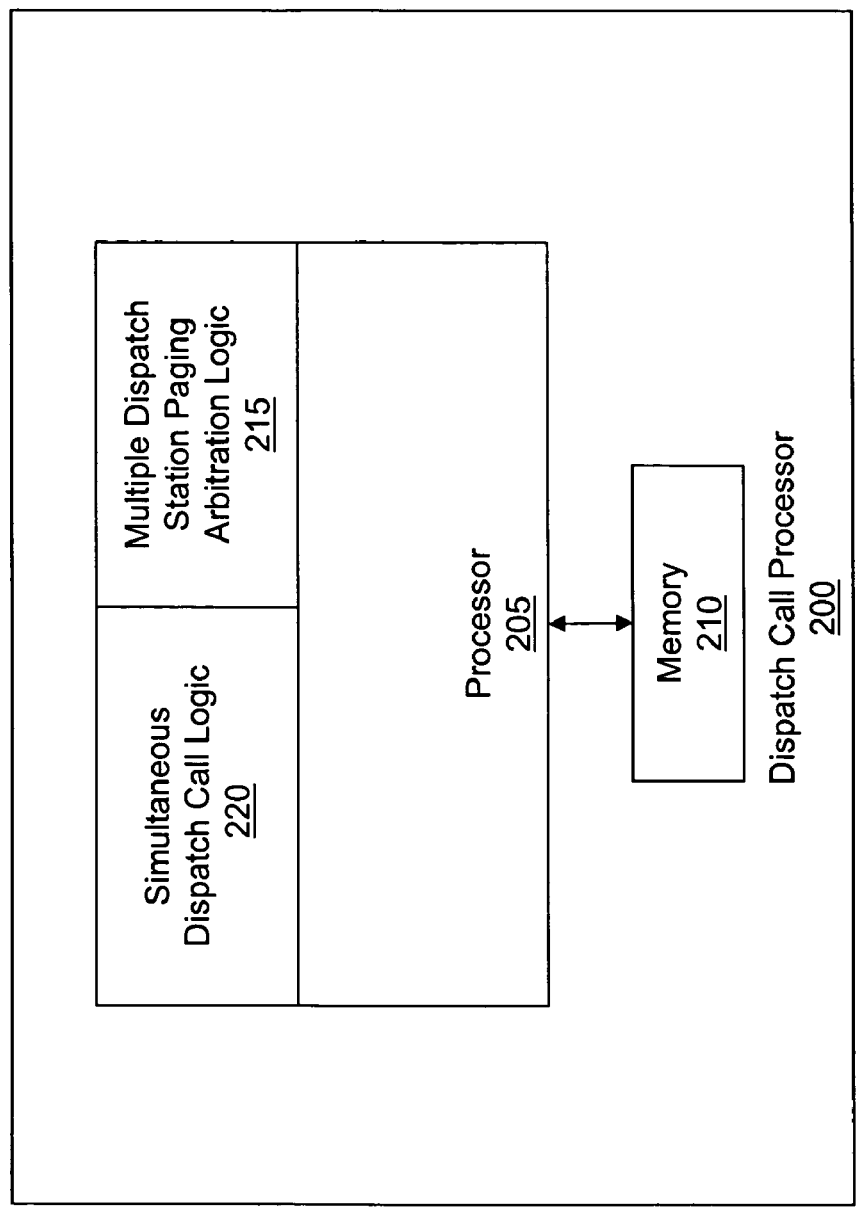
FIG. 2 illustrates an exemplary dispatch call handler in accordance with the present invention.

FIG. 2 illustrates an exemplary dispatch call handler in accordance with the present invention. The dispatch call handler 200 includes processor 205 and memory 210. Processor 205 includes multiple dispatch station paging arbitration logic 215, which will be described in more detail below in connection with the method of FIG. 3, and simultaneous dispatch call logic 220, which will be described in more detail below in connection with the method of FIG. 4. The processor can be a microprocessor, field programmable gate array (FPGA), application specific integrated circuit (ASIC) and/or the like. Memory 210 can be any type of memory including volatile or non-volatile memory, flash memory or a hard disk, random access memory or read only memory, or any combination thereof. When processor 205 is a microprocessor, logic 215 and 220 can be processor executable code loaded from memory 210.

Figure 3:
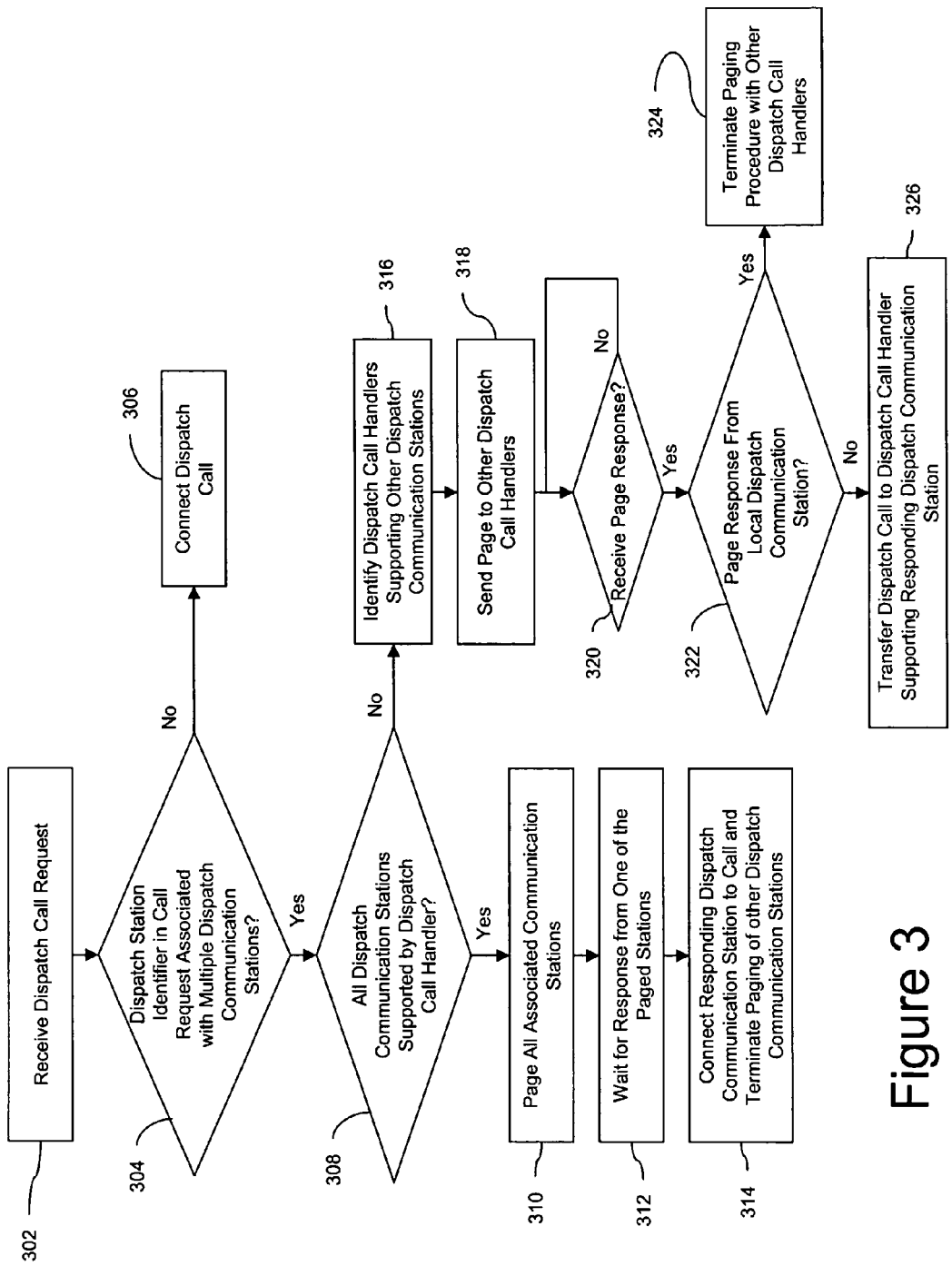
FIG. 3 is a flow chart illustrating an exemplary method for dispatch call paging to multiple dispatch stations in accordance with the present invention.

FIG. 3 is a flow chart illustrating an exemplary method for dispatch call paging to multiple dispatch stations in accordance with the present invention. When dispatch call handler 200 receives a dispatch call request (step 302), logic 215 determines whether the dispatch station identifier included in the call request is associated with multiple dispatch stations (step 304). The association of multiple dispatch stations with a dispatch station identifier can be stored in call register 112 or another database (not illustrated). Each of the multiple dispatch stations can have a single dispatch station identifier, and each of the multiple dispatch stations can be associated with the other dispatch station identifiers. The association of dispatch station identifiers with dispatch stations can be performed via an interactive voice response system, a live-human operator, a web-based interface and/or the like.

When the dispatch station identifier in the dispatch call request is not associated with multiple dispatch stations ("No" path out of decision step 304), then the dispatch call is established in accordance with conventional procedures (step 306). When logic 215 determines that there are multiple dispatch stations associated with the dispatch station identifier ("Yes" path out of decision step 304), then logic 215 determines whether all of the dispatch stations are supported by the call handler (step 308). This determination can be based on the information previously obtained from the call register 112, or a new request can be performed to obtain this information.

When all of the dispatch stations are supported by the dispatch call handler ("Yes" path out of decision step 308), then the dispatch call handler pages all associated dispatch stations (step 310) and waits for responses from one of the paged dispatch stations (step 312). Some dispatch communication systems provide two different types of one-to-one dispatch calls, dispatch call alerts and dispatch private calls. Dispatch call alerts merely notify the destination dispatch station of the incoming dispatch call, and the dispatch call is connected by the destination actuating the dispatch call button of the dispatch station. In contrast, a dispatch private call includes audio from the originator of the call that is automatically reproduced by the destination dispatch station (commonly referred to as "forced-audio"). Accordingly, when the incoming dispatch call is a dispatch private call, each of the associated dispatch stations will reproduce the audio from the originator until one of the associated dispatch stations responds to the page.

When the first dispatch station responds to the page, then logic 215 connects the responding dispatch station to the dispatch call and terminates paging of and providing forced-audio to the other dispatch stations (step 314). A dispatch station responds to the page by actuating a dispatch call button on the dispatch station. While the dispatch call button is depressed, an operator of the destination dispatch station can provide audio to the dispatch station, which is then delivered to the call initiator upon release of the button.

When at least one of the dispatch stations is supported by a different call handler ("No" path out of decision step 308), then logic 215 identifies the dispatch call handlers supporting the other dispatch stations (step 316). This determination can be based on the information previously obtained from the call register 112, or a new request can be performed to obtain this information. The dispatch call handler then sends pages to the other identified dispatch call handlers (step 318) and waits for a response to the page (step 320).

When a response to the page is received ("Yes" path out of decision step 320), then logic 215 determines whether the page response is from a local dispatch station (step 322). When the page response is from a dispatch station supported by the call handler ("Yes" path out of decision step 322), then logic 215 controls the call handler to terminate the paging procedure with the other dispatch call handlers and establish the dispatch call with the responding dispatch station (step 324). When the page response is from a dispatch station supported by another dispatch call handler ("No" path out of decision step 322), then logic 215 controls the transfer of the dispatch call to the dispatch call handler supporting the responding dispatch station and terminates the paging process for all other dispatch stations (step 326).

Figure 4:
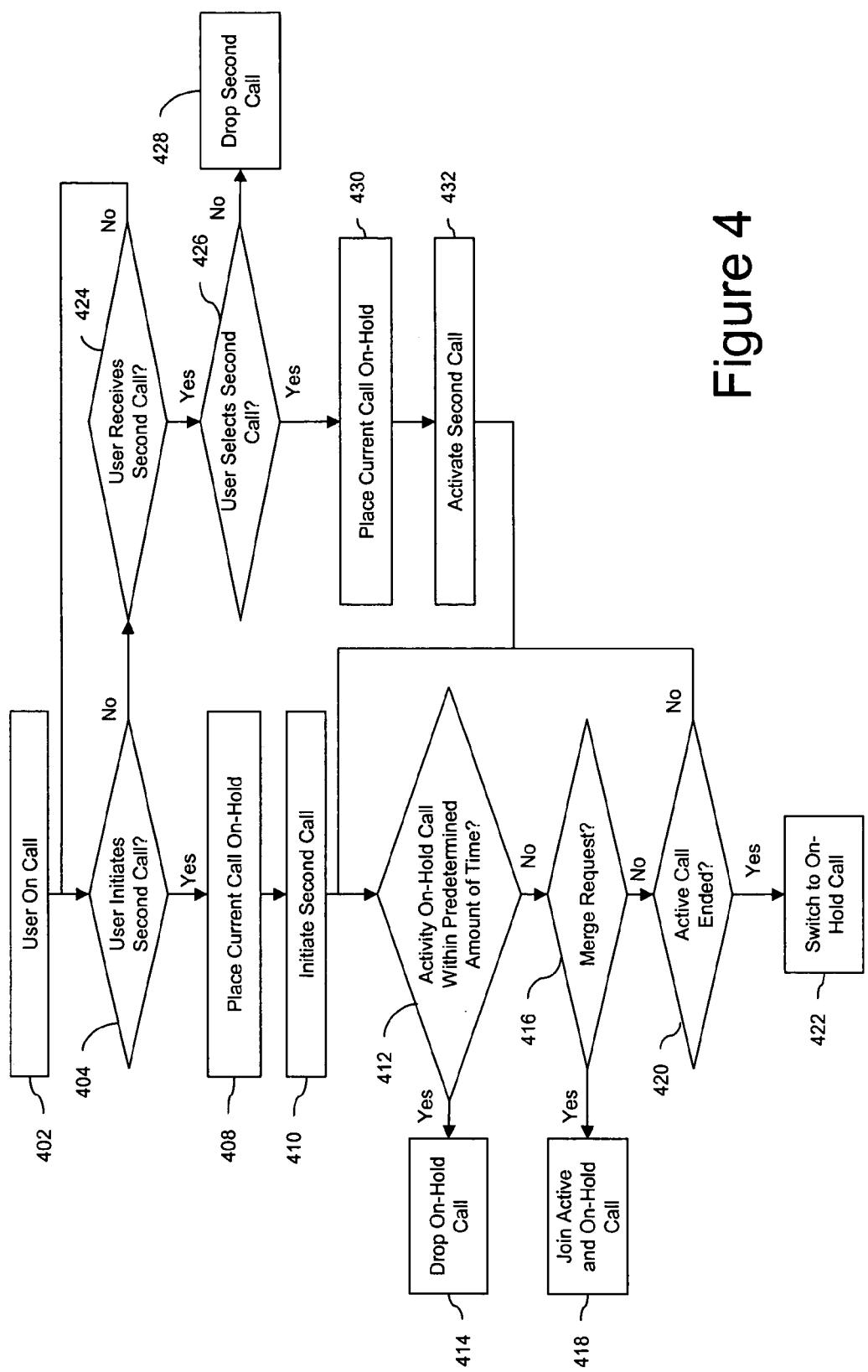
FIG. 4 is a flow chart illustrating an exemplary method for managing multiple dispatch calls in accordance with the present invention.

FIG. 4 is a flow chart illustrating an exemplary method for managing multiple dispatch calls in accordance with the present invention. As used herein, a dispatch call includes a private dispatch call, a call alert, a group dispatch call, a dispatch chatroom call (e.g., an ad-hoc or closed chatroom), or the like. While a user is on a call (step 402), logic 220 determines whether the user initiates a second call (step 404). The user can initiate a dispatch call by selecting a soft key requesting that the active call be placed on-hold and by entering an address of another dispatch station, for example, by using an address book entry or by manually entering the address.

When the user has initiated a second call ("Yes" path out of decision step 404), then logic 220 places the current call on-hold (step 408) and initiates the second call (step 410). If conservation of radio resources is desired, signaling and media for the on-hold call is not transmitted over the radio access network to the dispatch station. If the dispatch call on-hold includes more than one additional dispatch station, the call will continue until there is no activity on the call. Specifically, logic 220 monitors the activity of the on-hold call to determine whether there has been any activity for a predetermined amount of time (step 412). When there has not been any activity on the on-hold call for the predetermined amount of time ("Yes" path out of decision step 412), then logic 220 instructs the dispatch call handler to drop the on-hold call (step 414). When there has been activity for the on-hold call within the predetermined amount of time ("No" path out of decision step 412), then logic 220 determines whether it has received a merge request (step 416).

When logic 220 receives a merge request ("Yes" path out of decision step 416), then logic 220 controls the dispatch call handler to join the active and on-hold dispatch calls into a single dispatch call (step 418). When logic 220 has not received a merge request ("No" path out of decision step 416), then logic 220 determines whether the active call has ended (step 420). When the active call has ended ("Yes" path out of decision step 420), then logic 220 controls the dispatch call handler to switch the on-hold call to the dispatch station (step 422). Instead of automatically switching to the on-hold call (step 422), the dispatch station can provide the user with the option of returning to the on-hold call or dropping the on-hold call. When the active call has not ended ("No" path out of decision step 420), then logic 220 continues to monitor the activity of the on-hold call (step 412).

When the user has not initiated a second call ("No" path out of decision step 404), logic 220 determines whether the user has received a second dispatch call (step 424). When the user receives a second dispatch call, the user will be alerted by an audible tone and/or a user interface message. Moreover, the caller can receive a distinct audible tone notifying him that the called party is on a call. When the user has not received a second dispatch call ("No" path out of decision step 424), then logic 220 determines whether the user has initiated a second call (step 404). Although not illustrated in FIG. 4, if the call ends and the user has not initiated a second call or received a second call, then the processing terminates.

When the user receives a second dispatch call ("Yes" path out of decision step 424), then logic 220 determines whether it has received an indication from the user that the user desires to connect to the second call (step 426). The user can select the second call using, for example, a soft key. When, after a predetermined amount of time, the user does not select the second call ("No" path out of decision step 426), then the second call is dropped (step 428). Alternatively, the user of the dispatch station can arrange to have the second call sent to voice mail. When the user selects the second call ("Yes" path out of decision step 426), then the current call is placed on-hold (step 430) and the second call is activated (step 432). The management of the second call and the on-hold call then proceeds as discussed above in connection with steps 412-422.

Although the method of FIG. 4 is described as involving two dispatch calls, the method is equally applicable to one dispatch call and one interconnect call. In this case, the dispatch call handler will coordinate with a corresponding network element of the interconnect communication system. Moreover, a dispatch station can freely switch between the active and on-hold calls using, for example, a soft key of the dispatch station. The user of the dispatch station can enable and disable the ability to receive notifications of incoming calls while active on a call. In the method of FIG. 4, audio from the on-hold call can be combined with audio from the active call, where audio from the on-hold is attenuated to a lower level than the active call. This allows the user of the dispatch station to continue to monitor the activity of the on-hold call.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for dispatch communications comprising the acts of:
   receiving a dispatch call request for a first dispatch station identifier;
   determining that the first dispatch station identifier is associated with at least two dispatch stations;
   paging, by a dispatch call handler, the at least two dispatch stations, wherein the page includes voice information;
   receiving, by the dispatch call handler, a response to the page from a first one of the at least two dispatch stations;
   terminating, by the dispatch call handler, the paging and provision of voice information to dispatch stations of the at least two dispatch stations other than the first one of the at least two dispatch stations that responds to the page when the response to the page is received by the dispatch call handler; and
   establishing a dispatch call exclusively between an initiator of the dispatch call request and the first one of the at least two dispatch stations that responds to the page.

2. A dispatch call handler comprising:
   simultaneous dispatch call logic arranged to
      establish a first dispatch call between a first dispatch station and a second dispatch station;
      receive an instruction from the first dispatch station to place the first dispatch call on-hold; and
      establish a second dispatch call between the first dispatch station and a third dispatch station, wherein the first and second dispatch calls are simultaneously maintained by a dispatch communication network, and
   wherein audio from the first dispatch call that is on-hold is combined with audio from the second dispatch call and the audio of the first dispatch call that is on-hold is attenuated to a lower level than the audio of the second dispatch call, and
   multiple dispatch station paging arbitration logic arranged to
      receive a dispatch call request for a first dispatch station identifier;
      determine that the first dispatch station identifier is associated with at least two dispatch stations;
      page the at least two dispatch stations, wherein the dispatch call handler receives a response to the page from one of the at least two dispatch stations; and
      establish a dispatch call exclusively with the one of the at least two dispatch stations that responds to the page, wherein the page includes voice information for the dispatch call, wherein when more than one of the at least two dispatch stations respond to the page, the dispatch call is established exclusively with the first of the at least two dispatch stations that responds to the page, wherein the dispatch call handler terminates the paging and provision of voice information to dispatch stations of the at least two dispatch stations other than the first one of the at least two dispatch stations responds to the page when the dispatch call handler receives the response to the page.

3. The dispatch call handler of claim 2, wherein the instruction includes a request to establish the second dispatch call.

4. The dispatch call handler of claim 2, wherein the second dispatch call is a dispatch call initiated from the third dispatch station to the first dispatch station.

5. The dispatch call handler of claim 2, wherein the simultaneous dispatch call logic is further arranged to
receive a request to merge the first and second dispatch calls; and
merge the first and second dispatch calls into a single dispatch call.

6. The dispatch call handler of claim 2, wherein the multiple dispatch station paging arbitration logic is further arranged to cease paging the other of the at least two dispatch stations that does not respond to the page.

7. The method of claim 1, further comprising:
determining whether all dispatch stations of the at least two dispatch stations are supported by the dispatch call handler; and
identifying other dispatch call handlers supporting dispatch communication supporting dispatch stations of the at least two dispatch stations when it is determined that all of the dispatch stations of the at least two dispatch stations are not supported by the dispatch call handler.

* * * * *